(12) United States Patent
Whiteman et al.

(10) Patent No.: US 10,948,114 B2
(45) Date of Patent: Mar. 16, 2021

(54) CONNECTOR FOR FLUIDIC CONNECTION BETWEEN TWO HOSES OR THE LIKE AND ARRANGEMENT ASSOCIATED

(71) Applicant: AKWEL CHIPPENHAM UK LIMITED, Chippenham (GB)

(72) Inventors: Joseph Whiteman, Chippenham (GB); Stephen Hall, Swindon (GB)

(73) Assignee: AKWEL CHIPPENHAM UK LIMITED, Chippenham (GB)

(*) Notice: Subject to any disclaimer, the term of this patent is extended or adjusted under 35 U.S.C. 154(b) by 191 days.

(21) Appl. No.: 16/041,124

(22) Filed: Jul. 20, 2018

(65) Prior Publication Data
US 2019/0024831 A1   Jan. 24, 2019

(30) Foreign Application Priority Data
Jul. 20, 2017   (FR) ...................................... 17/56897

(51) Int. Cl.
*F16L 31/00* (2006.01)
*F16L 31/02* (2006.01)
*F16L 41/08* (2006.01)

(52) U.S. Cl.
CPC ............... *F16L 31/02* (2013.01); *F16L 41/08* (2013.01)

(58) Field of Classification Search
CPC .................................. F16L 31/02; F16L 41/08
See application file for complete search history.

(56) References Cited

U.S. PATENT DOCUMENTS

| 4,637,638 A | 1/1987 | Rush et al. |
| 6,220,634 B1* | 4/2001 | Burrowes .................. C08J 5/04 285/133.11 |
| 6,871,880 B1* | 3/2005 | Olson .................. A01G 25/023 285/192 |

FOREIGN PATENT DOCUMENTS

| FR | 2 772 875 A1 | 6/1999 |
| FR | 2 775 509 A1 | 9/1999 |
| GB | 2 118 264 A | 10/1983 |
| WO | 87/07353 A1 | 12/1987 |

* cited by examiner

*Primary Examiner* — Gilbert Y Lee
(74) *Attorney, Agent, or Firm* — Oliff PLC (57) ABSTRACT

A connector for connecting at least a first hose having a globally cylindrical wall and a second hose with each other, the connector includes at least one spigot including at least a first end configured to be connected to the second hose, and a second end configured to be connected to the first hose, the spigot allowing an hermetic fluidic connection between the first hose and the second hose, wherein the connector further includes at least one compression element being slidably movable between the first end and the second end of the spigot, the compression element being in a locking position wherein the compression element resists a compression force on the first hose at the level of the second end of spigot, in order to secure the fluidic connection.

12 Claims, 6 Drawing Sheets

CONNECTOR FOR FLUIDIC CONNECTION BETWEEN TWO HOSES OR THE LIKE AND ARRANGEMENT ASSOCIATED

The invention relates to a connection system used for connecting flexible hoses with each other or with another tubular part of a component.

The invention particularly applies in the following technical areas: connection of EPDM-based (Ethylene propylene diene monomer) rubber hoses or other rubber or flexible hoses with each other or with other components for example engine and ancillary components on an automobile or for the purpose of transferring fluid.

To connect a plurality of hoses with each other, it is known to use T-connector which is typically an injection moulded piece of plastic shaped as a "T" which comprises three tubular ends. Two of said ends are aligned forming a main tubular path and one of the ends is arranged in a secant manner, preferentially perpendicular, to the main tubular path. The said known T connector is a single moulded piece and can be a quick connector, a spigot or can comprise screwing means on the ends, in order to secure the fluidic connection between the hoses. The drawback of these kinds of T-connectors is that the said connectors require a lot of space and cannot be used in bends of the hoses, only at the straight ends of the hoses and also require a joining method using clips or crimps or clamps.

Based on the above, the aim of the invention is to provide a compact and light connector which can be used anywhere in the hose to connect it to at least one other hose or to at least one other tubular part of a component.

For this purpose, the object of the invention is a connector for connecting at least a first hose having a globally cylindrical wall and a second hose with each other, the said connector comprises at least one spigot comprising at least a first end configured to be connected to the second hose, and a second end configured to be connected to the first hose, the spigot allowing an hermetic fluidic connection between the first hose and the second hose, characterized in that the said connector further comprises at least one compression element being slidably movable between the first end and the second end of the spigot, the compression element being in a locking position wherein the compression element resists a compression force on the first hose at the level of the second end of spigot, in order to secure the fluidic connection. The connector according to the invention is therefore compact, easy to assemble and to manufacture and avoids the requirement for some high density metallic clamps and their associated processes/additional parts.

According to the invention, the word "spigot" is to be understood as a male end of a pipe which is intended to penetrate a widened fit into a hose, pipe or other.

According to the invention, the second end of the spigot is configured to be inside the first hose through an end of the first hose or through an opening made in the first hose's wall.

According to the invention, the first end of the spigot is configured to be inside the second hose through an end of the second hose or through an opening arranged in the second hose's wall.

According to a feature of the invention, the second end of the spigot comprises a stop ring flange.

According to a feature of the invention, the stop ring flange is partially curved, flat or bevelled.

The curved form of the stop ring flange is advantageous because it follows the natural curvature of the first hose circumference, it allows, for a uniform seal, compressing a large area of the hose. Moreover, it can be sized for different hose sizes and can be used to align components concentrically with the hose central longitudinal axis or centreline.

The bevelled/bespoke form of the stop ring flange is advantageous because it allows manipulation of the first hose shape in order to prevent the first hose from being generally cylindrical. Moreover, this form allows localisation of the compression, sizing for different hoses, and allows, for a uniform seal, compressing a generally flat area uniformly.

According to a feature of the invention, the stop ring flange can incorporate one or more circumferential ribs in order to facilitate the compression of the first hose, and to improve the sealing function.

According to a feature of the invention, the curvature of the stop ring flange is oriented in the same direction than the curvature of the first hose's wall.

According to the invention, the spigot is typically hollow and comprises an opening extending throughout the spigot along a longitudinal axis C-C of the spigot.

According to a feature of the invention, the spigot can comprise one or more circumferential groove(s) configured to cooperate with at least one retainer of the compression element.

According to a feature of the invention, the circumferential groove(s) is/are arranged between the first end and the second end of the spigot.

Advantageously, having several circumferential grooves allows to compress different hose thicknesses, and allows to adapt the connection system to different type of hoses, or allows to adapt the connection system to the variation in production of the hose wall thickness.

According to a feature of the invention, the compression element comprises a base. Advantageously, the base of the compression element comprises a contact surface configured to be in contact with the first hose, the contact surface is flat or curved and may incorporate one or more circumferential groove or rib. Advantageously, the contact surface can comprise a compression enhancer which allows for localised compression of the first hose.

According to a feature of the invention, the curvature of the contact surface can be oriented in the same direction than the curvature of the first hose's wall.

According to a feature of the invention, the compression element can further comprise a protruding portion positioned on the base.

According to a feature of the invention, the compression element comprises an orifice configured to house a part of the spigot, the orifice being arranged throughout the protruding portion and the base, according to a longitudinal axis of the compression element.

According to a feature of the invention, the compression element comprises at least one retainer configured to cooperate at least partially with circumferential groove(s) arranged on the spigot. In particular, the retainer comprises a head adapted to fit into circumferential groove(s) arranged on the spigot.

According to a feature of the invention, the at least one retainer is arranged inside the orifice of the compression element and is extending from the base to at least one part of the protruding portion.

Preferentially, the compression element comprises a plurality of retainers. Advantageously, the retainers are distributed regularly inside the orifice of the compression element.

According to a feature of the invention, the stop ring flange of the spigot and the base of the compression element, form an interstitial gap shaped to receive the first hose.

According to a feature of the invention, the height α of the interstitial gap corresponds to the thickness of the wall of the first hose when said wall is compressed by a preset compression imposed by the compression element. Preferentially, the preset compression is of 1% to 70% of the thickness of the first hose's wall. More preferentially, the preset compression is of 10% to 30% of the thickness of the first hose's wall, and even more preferentially, the preset compression is of 30% of the thickness of the first hose's wall.

According to a variant of the invention, the compression element comprises at least one indexing dilation protection tab configured to prevent or mitigate the effects of dilation upon the first hose from dilation and protect the area from excessive distortion, said at least one indexing dilation protection tab being arranged partially on the circumference of the first hose.

Preferentially, the compression element comprises two indexing dilation protection tabs arranged opposite to each other relative to the base.

Advantageously, the indexing dilation protection tab(s) deliver the location of the compression element. Moreover, the circumferential groove constrains the indexing dilation protection tab(s). Therefore, the circumferential groove and the position thereof can have a key role in the success of the seal and the formation of the interstitial gap α.

According to a feature of the invention the spigot and the compression element are made of any material, including metals, thermoplastic, like, for example, polyamides, and polyphthalamides, with or without glass or carbon fibres or other reinforcement materials.

Alternatively, the compression element comprises one dilation protection ring configured to be positioned around the circumference of the first hose. The dilation protection ring or indexing dilation protection tab has the advantage to be able to resist the external and internal loadings upon the joint.

The retaining ring provides a snap-fit retention feature which has the advantage that the joining method between the spigot, the compression element and the main hose is dependent on an embedded feature of the spigot or the compression element. Advantageously, the snap-fit allows for simple installation. Moreover, the snap-fit retention allows for repeatable and determined levels of compression to the hose, which can be achieved by controlling the dimensions between the sealing surface of the compression element and the spigot.

Alternatively, the compression element can be joined permanently or semi-permanently, by ultrasonic or laser welding to the spigot, adhesive bonding or can be over-moulded by injection.

Another object of the invention is an arrangement comprising one connector of the invention, at least one first hose having a globally cylindrical wall, the second end of the connector being connected to the first hose. More particularly and preferentially, the second end of the connector is arranged at least partially inside an orifice arranged on the first hose.

According to a feature of the invention, the arrangement comprises a second hose, the first end of the connector being connected to the said second hose. More particularly and preferentially, the first end of the connector is arranged at least partially inside an orifice arranged on the second hose.

According to a feature of the invention, the first hose extends in a first direction according to a longitudinal axis A-A, the second hose extends in a second direction according to a longitudinal axis B-B. The first hose and the second hose can be positioned substantially perpendicular one compared to the other, or in inclined position with respect to each other. In the case of an inclined position, the spigot will have preferentially a bent shape.

Alternatively, the centre-line or the centre-curve of the first and/or second hoses could be of a substantially circular shape, or curved shape. Therefore, the invention can always be perpendicular to the tangent of the hose centre-line, allowing for the use in extreme geometries, on corners, etc.

According to a feature of the invention, the spigot, and preferentially the second end of the spigot, comprises at least one indexing member. More preferentially the spigot comprises two indexing members arranged opposite to each other on the second end of the spigot according to a first axis of alignment.

According to an alternate feature of the invention, the compression element, and preferentially the stop ring flange, comprises at least one indexing member. More preferentially the compression element comprises two indexing members arranged opposite to each other on the stop ring flange according to a second axis of alignment.

In order to have correct positioning of the compression element in a locking position, the first axis of alignment and the second axis of alignment have to be collinear or aligned. Preferentially, the correct positioning of the compression element in a locking position is obtained when the first axis of alignment, the second axis of alignment and the longitudinal axis of the first hose are collinear or aligned.

According to a feature of the invention, the indexing members of the compression element and/or the indexing members of the spigot are shaped as cuts or grooves.

According to a feature of the invention, the deformation of the first hose due to the compression, can be globally cylindrical or non-cylindrical.

The invention will be better understood thanks to the detailed specification hereinafter, which describes several embodiments of the invention as examples and based on the following figures.

Figure 1:
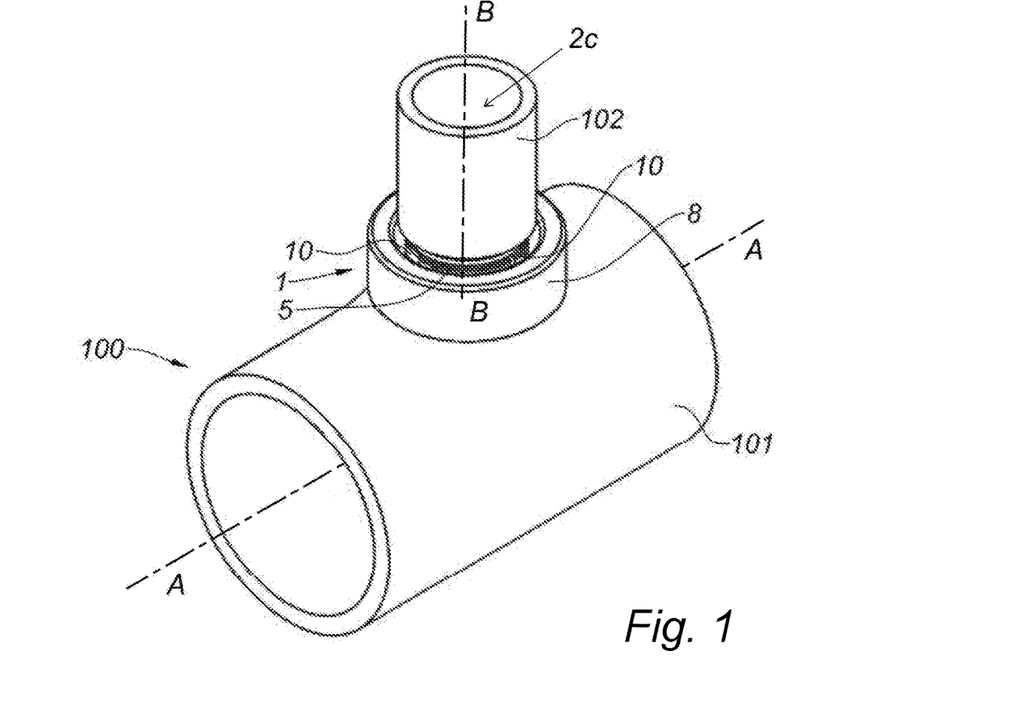
FIG. 1 is a perspective view of the arrangement according to the invention

According to any embodiment of the connector 1 of the invention, the arrangement 100 according to the invention comprises a first hose 101, a connector 1 according to the invention and which will be described in details hereinafter. The arrangement 100 can comprises a second hose 102 illustrated in FIG. 1 for example. The first hose 101 extends in a first direction according to a longitudinal axis A-A, the second hose 102 extends in a second direction according to a longitudinal axis B-B. Preferentially and as shown in FIG. 1, the first hose 101 and the second hose 102 are positioned globally perpendicular one compared to the other.

According to any embodiment of the connector 1 of the invention, the said connector 1 comprises a spigot 2 having at least a first end 2b configured to be connected to the second hose 102 and a second end 2a configured to be connected to the first hose 101. In the arrangement 100 according to the invention, the second end 2a of the spigot 2 of the connector 1 is inside the first hose 101 through an opening 103 made in the first hose's wall 101 and the first end 2b of the spigot 2 of the connector 1 is inside the second hose 102 through an end of the second hose 102.

Figure 5:
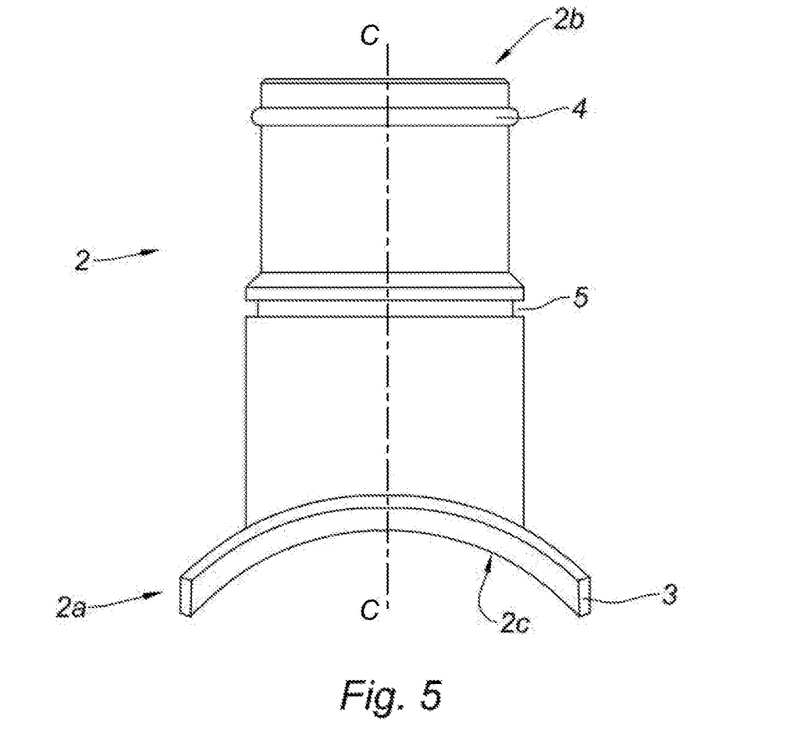
FIG. 5 is a front view of the spigot of the connector according to the first embodiment of the invention.

According to any embodiment of the connector 1 of the invention, and as shown in particular in FIG. 5, the spigot 2 is globally tubular and extending along a longitudinal axis C-C. The spigot 2 is, in this example hollow. But the invention is not limited to this example, the spigot 2 can assume other forms. The spigot 2 can comprise an opening 2c extending throughout the spigot 2 along the longitudinal axis C-C of the spigot 2. The second end 2a of the spigot 2 comprises a stop ring flange 3. The first end 2b of the spigot 2 can comprise a spigot end form 4. Moreover, the spigot 2 comprises a circumferential groove 5 arranged between the first end 2b and the second end 2a of the spigot 2.

Alternatively, in a variant not illustrated, the spigot 2 could incorporate one or several circumferential ribs on its second end 2a, in order to interface with the first hose 101, during assembly, to improve the sealing between the spigot 2 and the first hose 101, and to facilitate the compression of the first hose 101, thanks to only local deformations of the first hose 101.

According to any embodiment of the connector 1 of the invention, the said connector 1 further comprises at least one compression element 6 being slidably movable between the first end 2b and the second end 2a of the spigot 2, as illustrated in FIGS. 2, 3, 6, 7, 8, 9, 11 and 14. As shown for example in FIGS. 2, 3, 7, 9, 11, 13 and 14, the compression element 6 is in a locking position at the level of the second end 2a of the spigot 2, wherein the compression element 6 holds its position, thereby exerting a force onto the first hose 101 at the level of the second end 2a of spigot 2.

According to any embodiment of the connector 1 of the invention and as illustrated in FIGS. 1 to 9, 11 to 14, the compression element 6 comprises a base 7, the base 7 having a contact surface 7a configured to be in contact with the first hose 101. The compression element 6 comprises an orifice 9 configured to house a part of the spigot 2, the orifice 9 being arranged throughout the base 7, according to the longitudinal axis D-D of the compression element 6. Advantageously, the base 7 is substantially polygonal. Optionally, the contact surface 7a can comprise a compression enhancer 16 which allows for localised compression of the first hose 101.

Alternatively, in a variant not illustrated, the compression element 6 could incorporate one or several circumferential ribs on the contact surface 7a, in order to interface with the hose 101, during assembly, to improve the sealing between the compression element 6 and the hose 101, and to facilitate the compression of the hose during the assembly, thanks to only local deformations of the hose.

Figure 3:
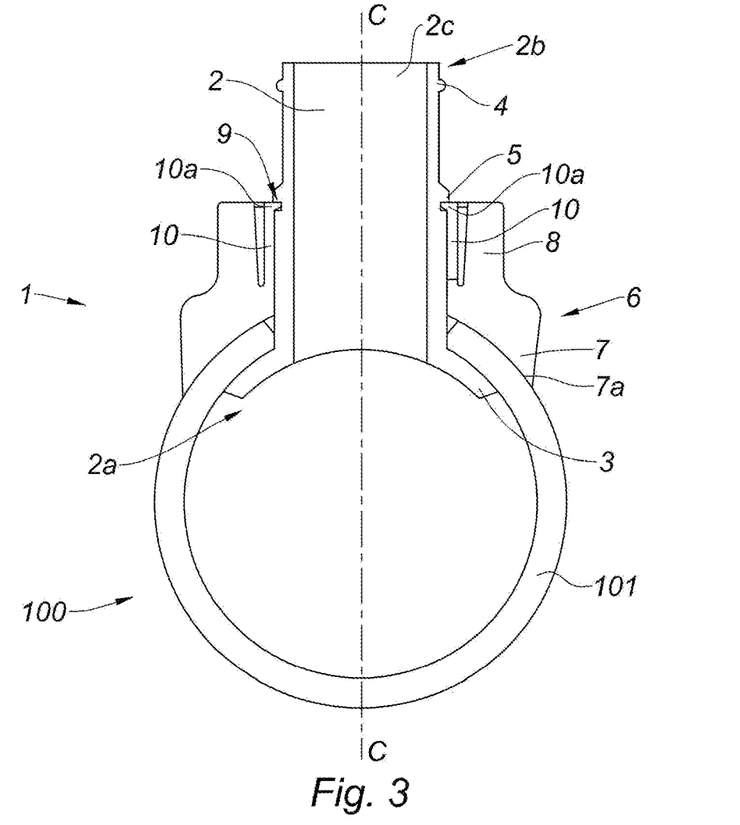
FIG. 3 is a cross-sectional view of the arrangement according to the invention comprising the connector according to the first embodiment of the invention.
Figure 4:
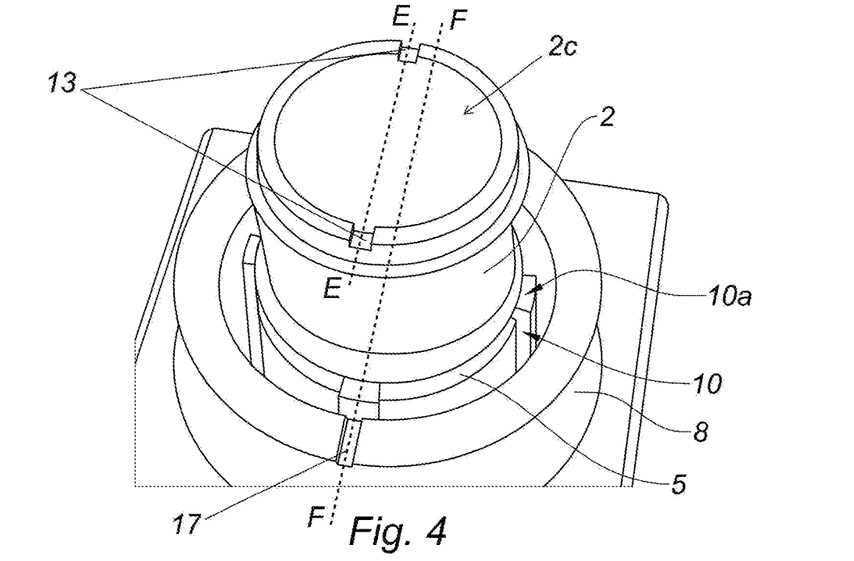
FIG. 4 shows a detail of the connector according to the first embodiment of the invention.

According to any embodiment of the connector 1 of the invention, the compression element 6 comprises a plurality of retainers 10, each configured to cooperate at least partially with the circumferential groove 5 arranged on the spigot 2. As illustrated in FIG. 4, each retainer 10 comprises a head 10a adapted to fit into the circumferential groove 5 arranged on the spigot 2. For example, in FIG. 6, the retainers 10 are arranged inside the orifice 9 of the compression element 6. In the examples shown to FIGS. 1 to 14, the retainers 10 are distributed regularly inside the orifice 9 of the compression element 6 but they can be distributed irregularly inside the orifice 9 without leaving of the scope of the invention. Advantageously, when the compression element 6 is in a locking position, the retainers' heads 10a are housed in the circumferential groove 5 of the spigot 2.

Figure 2:
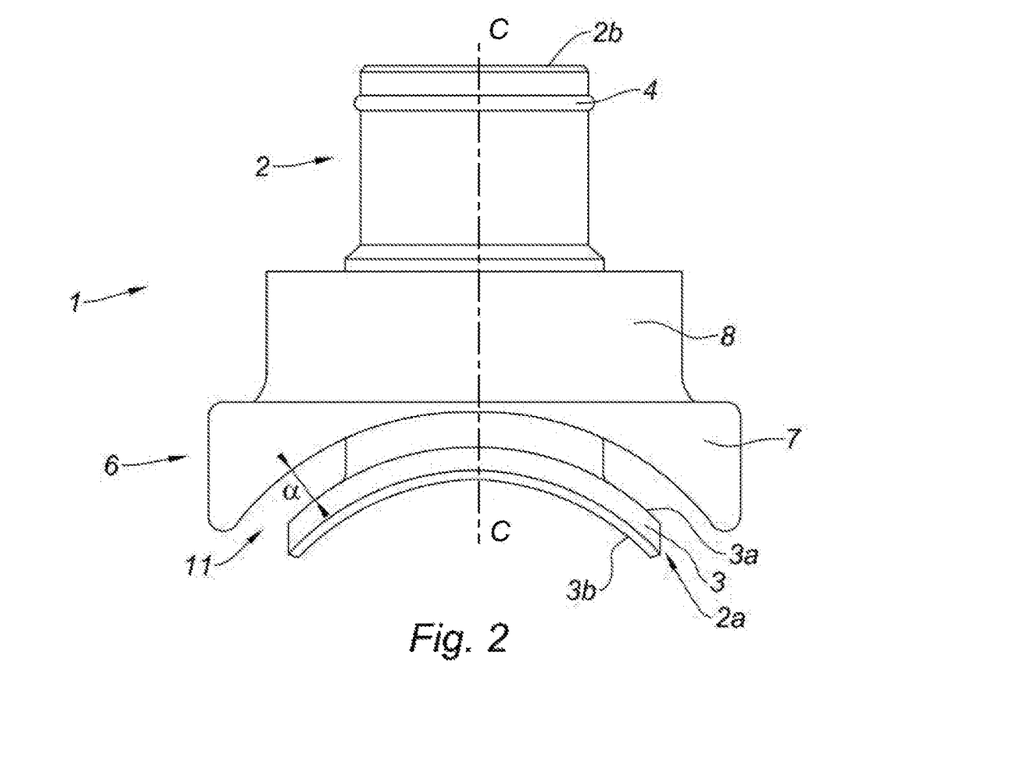
FIG. 2 is a front view of the connector according to a first embodiment of the invention.

According to any embodiment of the connector 1 of the invention as represented in FIG. 2 as an example, the stop ring flange 3 of the spigot 2 and the base 7 of the compression element 6 form an interstitial gap 11 shaped to receive the first hose 101. The height α of the interstitial gap 11 corresponds to the thickness of the wall of the first hose 101 when said wall is compressed by a preset compression imposed by the compression element 6. The interstitial gap 11 forms then globally a portion of cylinder.

According to any embodiment of the connector 1 of the invention as represented in FIG. 4 as an example, the spigot 2 comprises two indexing members 13 arranged opposite to each other on the second end 2b of the spigot 2 according to a first axis of alignment E-E. Moreover, the compression element 6 comprises two indexing members 17 arranged opposite to each other on the stop ring flange 3 according to a second axis of alignment F-F. In this example, the correct positioning of the compression element 6 in a locking position is obtained when the first axis of alignment E-E, the second axis of alignment F-F and the longitudinal axis A-A of the first hose 101 are aligned.

The connector 1 according to the first embodiment will be described hereinafter in reference to the FIGS. 2 to 6.

The compression element 6 of the connector 1 according to the first embodiment specifically comprises a protruding portion 8 positioned on the base 7. The compression element 6 comprises an orifice 9 configured to house a part of the spigot 2, the orifice 9 being arranged throughout the protruding portion 8 and the base 7, according to the longitudinal axis D-D of the compression element 6. Advantageously, the protruding portion 8 is substantially cylindrical.

The connector 1 according to the first embodiment further comprises a curved stop ring flange 3. The curvature of the stop ring flange 3 is oriented in the same direction as the curvature of the first hose's wall to secure as shown in FIGS. 3 and 5. Furthermore, according to the first embodiment of the connector 1, the base 7 of the compression element 6 comprises at least two opposed sides having each a curved shape adapted to the curvature of the first hose's wall to compress/secure.

Figure 6:
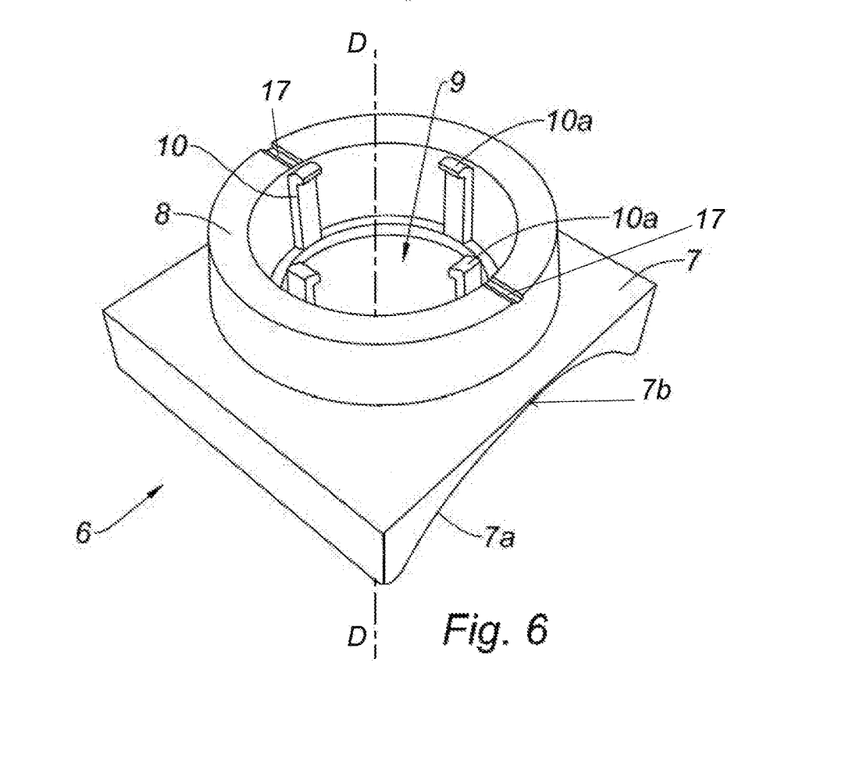
FIG. 6 is a perspective view of the compression element of the connector according to the first embodiment of the invention.

Moreover, and according to the first embodiment of the connector 1, the retainers 10 are arranged inside the orifice 9 of the compression element 6 and are extending from the base 7 to at least one part of the protruding portion 8. According to a variant of the invention not illustrated, a plurality of retainers can protrude from the spigot and being received by the compression element.

Figure 7:
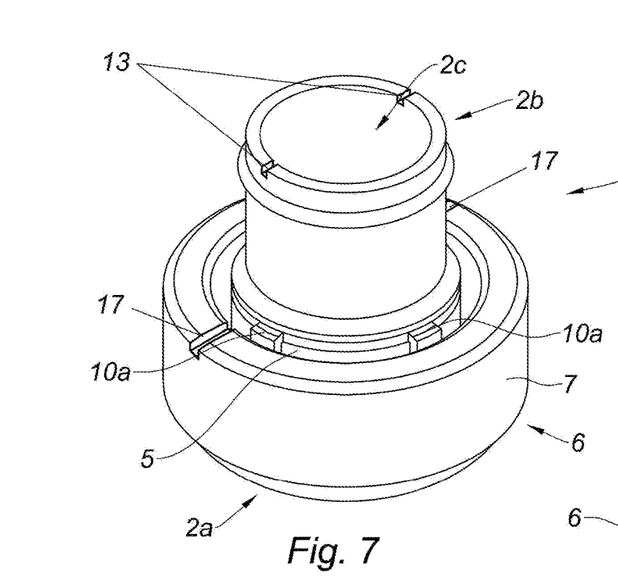
FIG. 7 is a perspective view of the connector according to a second embodiment of the invention.
Figure 8:
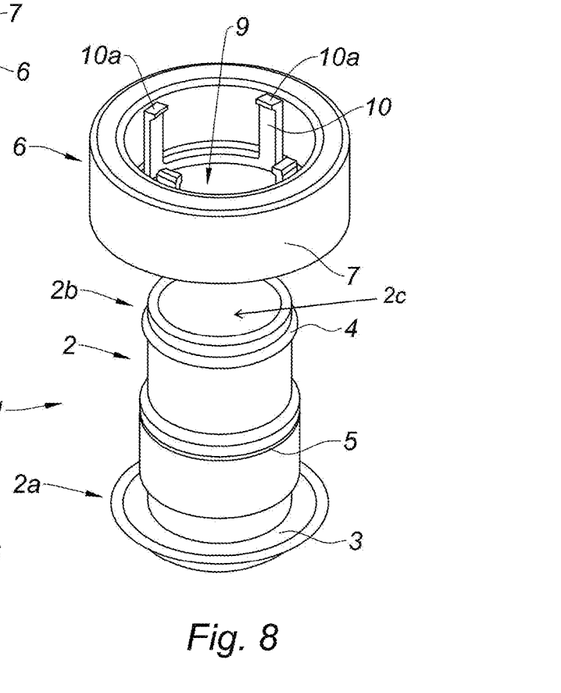
FIG. 8 is an exploded view of the connector according to a second embodiment of the invention.

The connector 1 according to the second embodiment will be described hereinafter in reference to the FIGS. 7 to 9.

The difference between the first embodiment of the connector 1 and the second embodiment is that the stop ring flange 3 of the spigot 2 is globally flat. Although, an embodiment exists, which introduces beads 12 onto the flat surface of the base 7 and/or the stop ring flange 3. More particularly, the first face 3a of the stop ring flange 3 which is in contact with the first hose's wall 101 is flat and the second face 3b of the stop ring flange 3 opposed to the first face 3a is bevelled. Moreover, the base 7 of the compression element 6 comprises at least two opposed sides that are flat.

The sealing function between the spigot 2 and the rubber hose 101, is then obtained by a local deformation of the rubber hose 101 into a flat shape, the rubber hose 101 being compressed between the flat surfaces 3a of the stop ring flange 3 and the flat surface 7a of the compression element. In the case of this second embodiment, the spigot 2 and the compression element 6 being of a globally cylindrical shape, no orientation alignment in rotation is needed around the axis C-C or D-D during the assembly.

Optionally, the first face 3a can comprise a compression enhancer 16 which allows for localised compression of the first hose 101.

Figure 9:
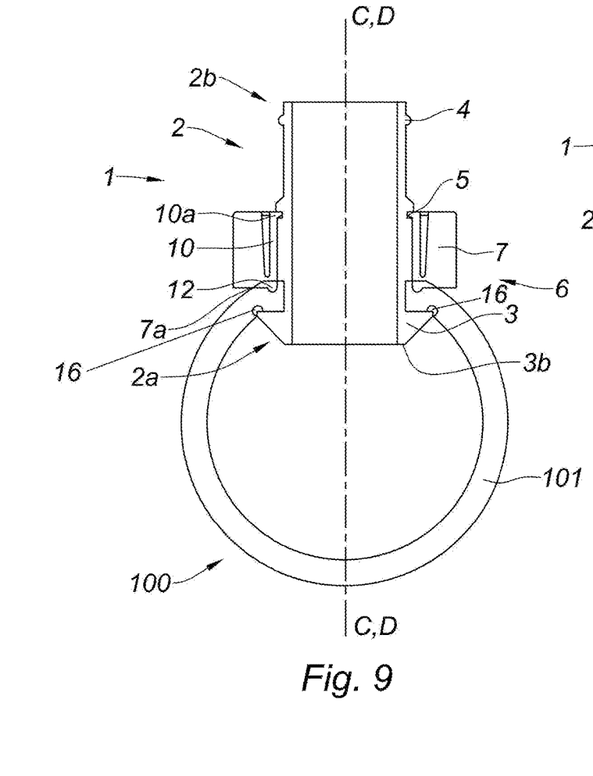
FIG. 9 is a cross-sectional view of the arrangement according to the invention comprising a connector according to a second embodiment of the invention.

In this particular embodiment, the first hose 101 can be deformed non cylindrically as represented in FIG. 9.

Figure 10:
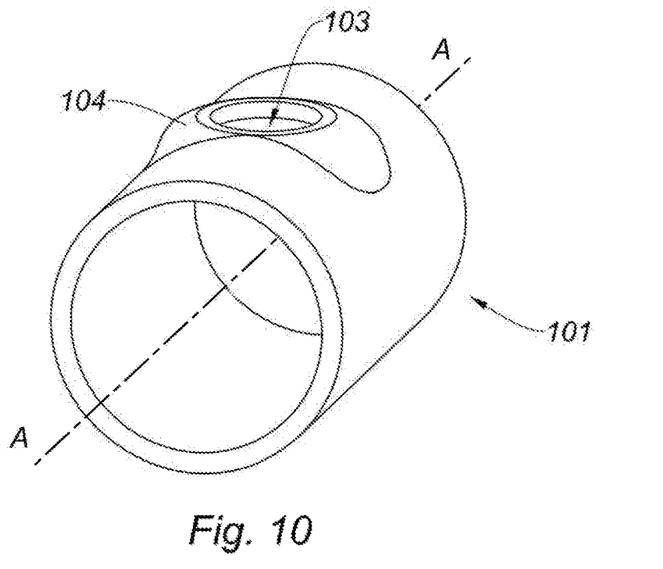
FIG. 10 is a perspective view of a hose configured to be connected with a connector according to a variant of the second embodiment of the invention.
Figure 11:
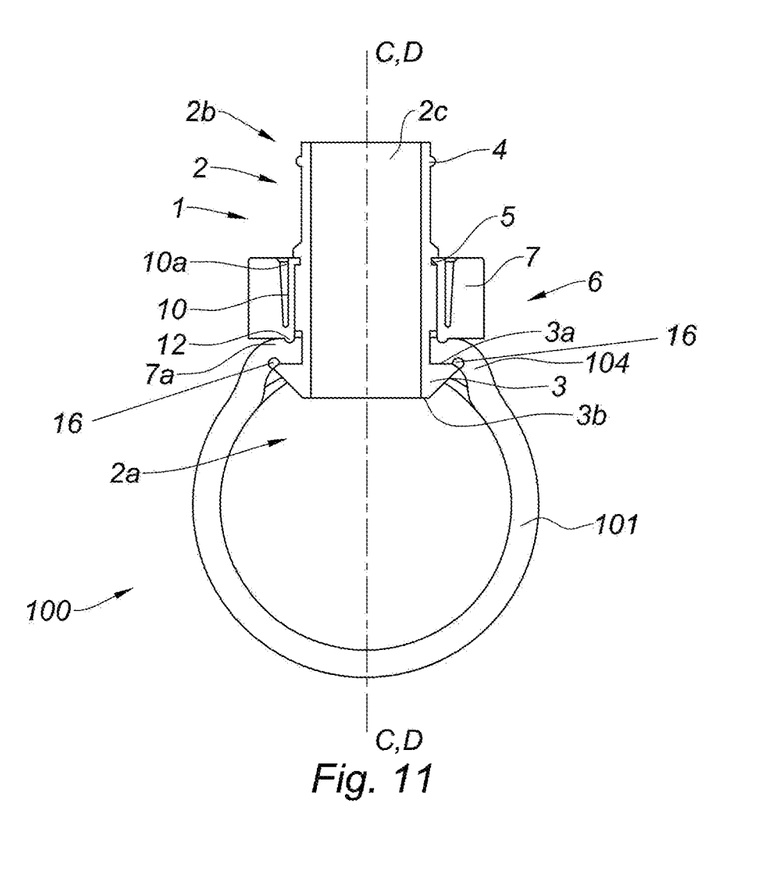
FIG. 11 is a cross-sectional view of the arrangement comprising a connector according to the variant of the second embodiment of the invention.

According to a variant of the second embodiment of the connector 1 illustrated in FIGS. 10 and 11, the first hose 101 has a preset shape 104 arranged around the opening 103 in order to receive the stop ring flange 3 of the spigot 2 of the connector 1.

Figure 12:
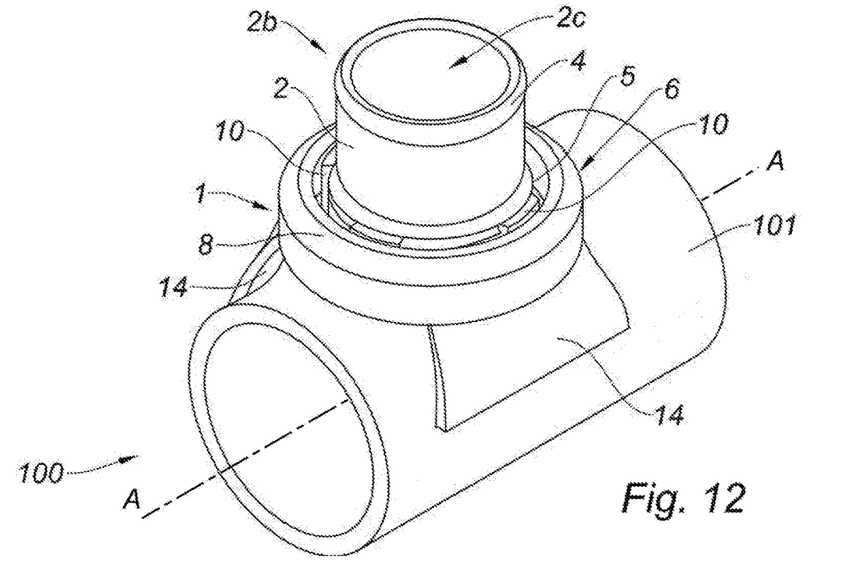
FIG. 12 is a perspective view of an arrangement according to the invention comprising a connector according to a third embodiment of the invention.
Figure 13:
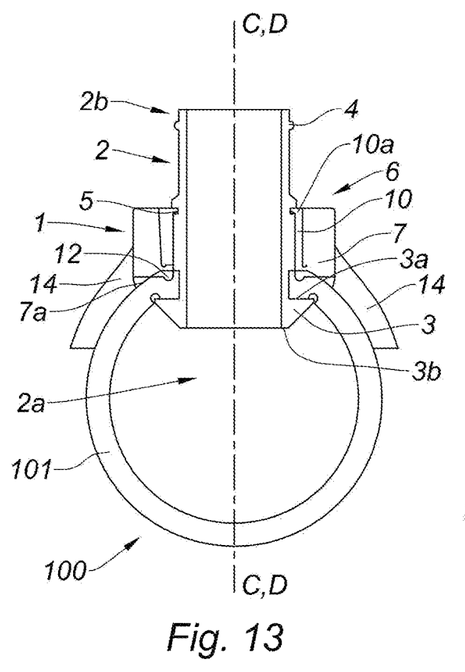
FIG. 13 is a cross-sectional view of the arrangement according to the invention comprising the connector according to a third embodiment of the invention.

The connector 1 according to the third embodiment will be described hereinafter in reference to the FIGS. 12 and 13.

The difference between the first embodiment or the second embodiment of the connector 1 and the third embodiment of the connector 1 is that the compression element 6 comprises two indexing dilation protection tabs 14. The two indexing dilation protection tabs 14 are configured to prevent the first hose 101 from dilation and protect the area with reduced distortion. The indexing dilation protection tabs 14 are arranged opposite to each other relative to the base 7. The indexing dilation protection tabs 14 are extending partially along the circumference of the first hose 101. As illustrated in FIG. 13, the stop ring flange 3 of the spigot 2 is flat. More particularly, the first face 3a of the stop ring flange 3 which is in contact with the first hose's wall 101 is flat and the second face 3b of the stop ring flange 3 opposed to the first face 3a is bevelled. Moreover, the base 7 of the compression element 6 comprises at least two opposed sides that are flat. In a variant not illustrated, the stop ring flange 3 can be curved and the contact surface 7a of the base 7 of the compression element 6 can be curved such as illustrated in the first embodiment.

Figure 14:
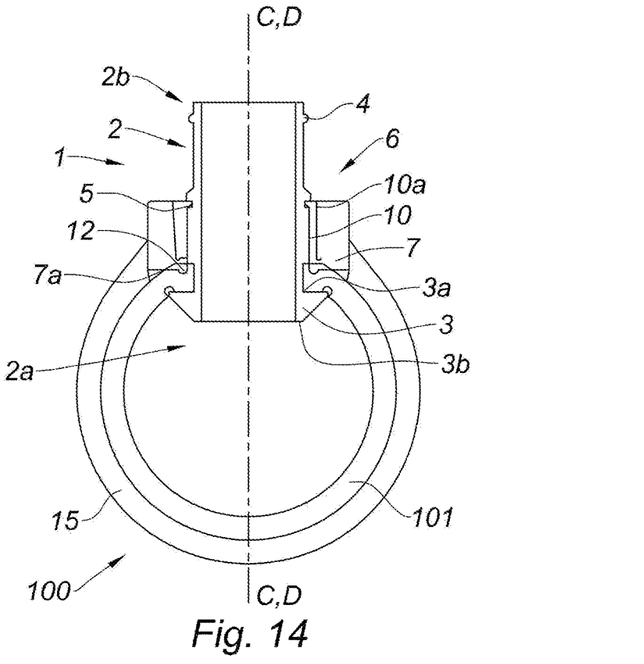
FIG. 14 is a cross-sectional view of the arrangement according to the invention comprising a connector according to a variant of the third embodiment of the invention.

According to a variant of the third embodiment of the connector 1 illustrated in FIG. 14, the compression element 6 comprises a dilation protection ring 15 extending around the circumference of the first hose 101.

According to any embodiment of the invention, the spigot 2 and the compression element 6 can be made of any material including metals such as aluminium, stainless steel, brass or thermoplastic, like polyamides, and polyphthalamides, with or without glass or carbon fibres or other reinforcement materials. The material of the spigot 2 could be made of a different material than the compression element 6. Alternatively, the compression element and the spigot can be fixed on the hose by welding, for example ultrasonic welding or laser welding. Alternatively, the compression element could be overmoulded by injection on the spigot and the hose.

Optionally, the first hose 101 centreline or centre-curve and B-B are substantially not perpendicular.

Obviously, the invention is not limited to the embodiments described and represented with the annexed figures. Modifications remain possible, in particular from the point of view of the constitution of the each element or by substitution of technical equivalents, without leaving for all that the scope of the invention.

The invention claimed is:

1. A connector for connecting at least a first hose having a globally cylindrical wall and a second hose with each other, the connector comprising:
   at least one spigot including at least (i) a first end configured to be connected to the second hose, (ii) a second end configured to be connected to the first hose, and (iii) a circumferential groove arranged between the first end and the second end of the spigot, the at least one spigot connecting the first hose and the second hose to form a hermetic fluidic connection between the first hose and the second hose; and
   at least one compression element including at least one retainer, the circumferential groove being configured to cooperate with the at least one retainer, the at least one compression element being slidably movable between the first end and the second end of the spigot, the at least one compression element being moveable into a locking position wherein the at least one compression element resists a compression force on the first hose at a level of the second end of spigot, in order to secure the hermetic fluidic connection.

2. The connector according to claim 1, wherein the second end of the spigot includes a stop flange ring.

3. The connector according to claim 2, wherein the stop flange ring is at least partially curved, the curvature of the stop flange ring being oriented in a same direction as a curvature of the cylindrical wall of the first hose.

4. The connector according to claim 1, wherein the compression element includes a base having a contact surface configured to be in contact with the first hose.

5. The connector according to claim 4, wherein the contact surface of the base of the compression element is curved, the curvature of the contact surface being oriented in a same direction as a curvature of the cylindrical wall of the first hose.

6. The connector according to claim 4, wherein the second end of the spigot includes a stop flange, and the stop ring flange of the spigot and the base of the compression element form an interstitial gap α shaped to receive the first hose.

7. The connector according to claim 6, wherein a height α of the interstitial gap corresponds to a thickness of the cylindrical wall of the first hose when the cylindrical wall is compressed by a preset compression imposed by the compression element.

8. The connector according to claim 7, wherein the preset compression of the cylindrical wall of the first hose is between 1% to 70% of the thickness of the cylindrical wall of the first hose.

9. The connector according to claim 1, wherein the base of the compression element has at least one compression enhancer configured to cooperate with the first hose.

10. The connector according to claim 1, wherein the compression element includes at least one indexing dilation protection tab configured to be positioned partially on a circumference of the first hose or the compression element includes one retaining ring configured to be positioned around the circumference of the first hose.

11. An arrangement comprising:
   the connector according to claim 1; and
   at least one of the first hose having the globally cylindrical wall, the second end of the connector being connected to the first hose.

12. The arrangement according to claim 11, wherein the second end of the spigot is configured to be located inside the first hose through an end of the first hose or through an opening formed in the cylindrical wall of the first hose, and the first end of the spigot is configured to be located inside the second hose through an end of the second hose or through an opening arranged in a wall of the second hose.

* * * * *